3,476,749
BENZOTHIAZIN-4-ONE-1,1-DIOXIDE
DERIVATIVES
Chris Royce Rasmussen, Ambler, Pa., assignor to McNeil Laboratories, Inc., a corporation of Pennsylvania
No Drawing. Filed Nov. 30, 1967, Ser. No. 686,795
Int. Cl. C07d 93/02; F21v 9/06
U.S. Cl. 260—243        8 Claims

ABSTRACT OF THE DISCLOSURE

The compounds herein are 3-(amino-ethylidene)-2,3-dihydro - 4H-1,2-benzothiazin-4-one-1,1-dioxides, useful for their ultra-violet absorbing properties and pharmacological activities.

---

This invention relates to novel benzothiazin-4-one-1,1-dioxides and, more particularly, to certain 3-[(1-NHR$_1$) ethylidene] - 2,3 - dihydro-4H-1,2-benzothiazin-4-one-1,1-dioxides and the preparation thereof. These novel organic compounds may be structurally represented as follows:

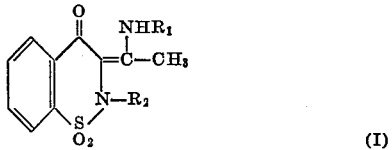

(I)

wherein R$_1$ is a member selected from the group consisting of hydrogen, lower alkyl, aryl, preferably phenyl, and aralkyl; and R$_2$ is a member selected from the group consisting of hydrogen, lower alkyl, aralkyl, di-(lower alkyl)-amino-(lower alkyl), lower alkoxy-carbonyl-lower alkyl, carbamyl-lower alkyl and carbamyl-lower alkyl.

As used herein, "lower alkyl" and "lower alkoxy" may be straight or branch chained saturated aliphatic hydrocarbons having from 1 to about 6 carbon atoms, such as, for example, methyl, ethyl, propyl, isopropyl, butyl, pentyl, hexyl and the like alkyls, and, respectively, the corresponding alkoxys such as methoxy, ethoxy, propoxy, isopropoxy, etc. The term "aralkyl" is preferably a phenyl-lower alkyl such as benzyl, phenethyl and the like. The preferred lower alkyl is methyl and the preferred lower alkoxy-carbonyl-lower alkyl is methoxy-carbonyl-methyl.

The compounds of Formula I, wherein R$_2$ is hydrogen, are obtained by treating the known compound [see H. Zinnes et al., J. Org. Chem., 30, 2241 (1965)], 3-acetyl - 2H-1,2-benzothiazin-4(3H)-one-1,1-dioxide (II), with an amino compound of Formula III, i.e., with ammonia or an appropriate primary amine, e.g., a lower alkylamine, aralkylamine or arylamine. With those amines that are liquid at ambient temperatures, e.g., the arylamines in general, no additional solvent is required. Otherwise, the reaction is preferably conducted in aqueous solution. Elevated temperatures may sometimes be advantageously employed. After completion of the reaction, the water solvent and/or excess liquid amine, as the case may be, can be removed, for example, by evaporation in vacuo, to yield the desired product (IV), which can then be purified by conventional techniques, for example, by recrystallization from suitable organic solvents.

The compounds of Formula I, wherein R$_2$ is lower alkyl, aralkyl, di-(lower alkyl)-amino-(lower alkyl), lower alkoxy-carbonyl-lower alkyl and carboxy-lower alkyl, are readily obtained by conventional alkylation of the N-unsubstituted compound (IV) with an appropriate alkylating agent of Formula V wherein R$_2$ is as just described (i.e., other than hydrogen and carbamyl-lower alkyl) and X is a suitable halo. Typical of such alkylating agents are the lower alkyl halides, e.g., methyl iodide, ethyl bromide, butyl bromide and the like; the aralkyl halides, e.g., benzyl bromide, β-phenethyl bromide and the like; the dialkylaminoalkyl halides, e.g., dimethylaminopropyl chloride, diethylaminoethyl chloride and the like; the alkoxy-carbonylalkyl halides, e.g., methyl bromoacetate, ethyl chloroacetate and the like; and the carboxy-lower alkyl halides, e.g., bromoacetic acid, bromopropionic acid and the like. The alkylation may be carried out in a variety of polar or nonpolar solvents such as the lower alkanols, e.g., methanol, ethanol, isopropanol and the like; ethers; dimethylformamide; or aromatic hydrocarbons such as benzene, toluene, xylene and the like. The alkylation is preferably carried out in the presence of an alkali or alkaline earth metal hydroxide or alkoxide.

The foregoing reactions may be illustrated by the following schematic diagram:

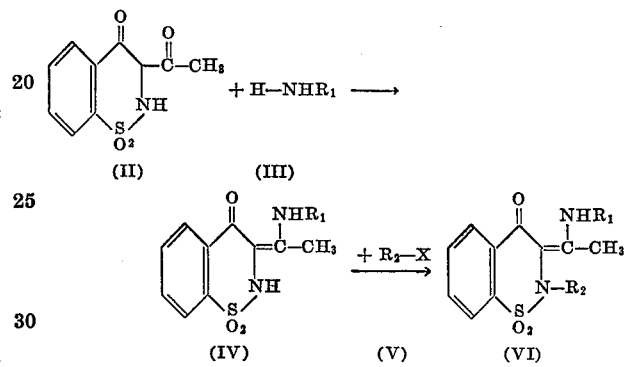

Alternative alkylating agents may also be used such as the alkyl sulfates, e.g., dimethyl sulfate, and the aromatic sulfonic acid esters, preferably an R$_2$-ester of p-toluene sulfonic acid, e.g., lower alkyl, benzyl and the like tosylates, whereby the appropriate R$_2$ moiety is introduced onto the ring nitrogen of the N-unsubstituted compound (IV).

Treatment of the ester compounds of Formula VI, that is, where R$_2$ is lower alkoxy-carbonyl-lower alkyl, with ammonia according to conventional ammonylsis procedures affords a method of obtaining the corresponding amide compounds of Formula I, that is, where R$_2$ is carbamyl-lower alkyl.

The compounds (I) of this invention absorb ultraviolet (U.V.) light and are useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g. nylon) fibers and polyester fibers. The inclusion of about 0.01–5.0 percent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

In addition, the novel compounds herein possess valuable pharmacological properties which make them suitable for incorporation into pharmaceutical forms. The subject compounds have been observed to possess anti-inflammatory activity as demonstrated in the kaolin-induced rat-paw edema or cotton pellet granuloma assays when orally administered to rats at doses ranging from 80–100 mg./kg. body weight. For example, when R$_1$=R$_2$=H, activity is observed in the cotton pellet assay at oral doses of about 80 mg./kg. Where R$_1$ or R$_2$ is other than hydrogen, 8–26 percent inhibition of the kaolin-induced rat-paw edema is demonstrated at about a 100 mg./kg. oral dose.

Furthermore, with compounds wherein $R_1$=H and $R_2$=methyl, or vice versa, ataxia has been observed in mice at intraperitoneal dosages of about 30 mg./kg. body weight, indicating central nervous system depressant activity.

The following examples are intended to illustrate, but not to limit, the scope of the present invention.

EXAMPLE I

3 - [(1 - amino)ethylidene] - 2,3 - dihydro - 4H - 1,2-benzothiazin-4-one-1,1-dioxide.—A solution of 10.7 g. (0.0448 mole) of 3-acetyl-2H-1,2-benzothiazin-4(3H)-one-1,1-dioxide in 110 ml. of conc. aqueous ammonia (28%) is allowed to stand for 2 days at room temperature. Excess ammonia and the majority of the water is removed in vacuo. The precipitated solid is filtered off and washed with acetone. Recrystallization from acetone (>1 liter) yields pure 3-[(1-amino)ethylidene]-2,3-dihydro - 4H - 1,2 - benzothiazin - 4 - one - 1,1 - dioxide, yellow crystals, M.P. 259–261° C. (dec.).

*Analysis.*—Calcd. for $C_{10}H_{10}N_2O_3S$: C, 50.41; H, 4.23; N, 11.76; S, 13.46%. Found: C, 50.32; H, 4.36; N, 11.85; S, 13.35, 13.41%.

EXAMPLE II (A) 3 - [(1 - amino)ethylidene] - 2,3 - dihydro - 2-methyl - 4H - 1,2 - benzothiazin - 4 - one - 1,1 - dioxide.— Ten grams (0.042 mole) of 3[(1-amino)-ethylidene]2,3-dihydro-4H-1,2-benzothiazin-4-one-1,1-dioxide is dissolved in 40 ml. of aqueous sodium hydroxide (10%) and 25 ml. of dimethyl sulfate is added over a 10–15 min. period. More alkali is added when the pH of the solution becomes acidic in order to maintain a pH >8. The reaction product is filtered off and washed well with water. The crude product is dissolved in methylene chloride and extracted twice with 50 ml. portions of sodium hydroxide (10%), washed with water (2×100 ml.) and twice with 50 ml. portions of saturated sodium chloride solution. The organic layer is dried over magnesium sulfate and the solvent removed in vacuo. Recrystallization of the residue from acetone-ethanol gives the pure material, 3 - [(1 - amino)ethylidene] -2,3 - dihydro - 2-methyl-4H-1,2-benzothiazin-4-one-1,1-dioxide, M.P. 199–201° C.

*Analysis.*—Calcd. for $C_{11}H_{12}N_2O_3S$ (252.30): C, 52.37; H, 4.79; N, 11.10; S, 12.71%. Found: C, 52.55; H, 4.77; N, 10.74; S, 12.85%.

(B) The procedure of Example II(A) is repeated except that an equivalent quantity of ethyl p-toluene sulfonate and benzyl p-toluene sulfonate, respectively, is used in place of the dimethyl sulfate used therein to yield, as respective products, the corresponding 2-ethyl and 2-benzyl derivatives of 3-[(1-amino)ethylidene]-2,3-dihydro-4H-1,2-benzothiazin-4-one-1,1-dioxide.

EXAMPLE III (A) 3 - [(1 - methylamino)ethylidene] - 2H - 1,2-benzothiazin-4(3H)-one-1,1-dioxide.—A solution of 2.39 g. (0.01 mole) of 3-acetyl-2H-1,2-benzothiazin-4(3H)-one-1,1-dioxide in 11 ml. of aqueous methylamine (30%) is allowed to stand for one day at room temperature in a tightly stoppered round-bottomed flask. Excess methylamine and water are then removed in vacuo. The residue is treated with methanol and collected on the filter, brilliant yellow crystals, M.P. 234–236° C. (dec.). A second crop of crystals is obtained by concentration of the mother liquor. Recrystallization from acetone affords the pure product, 3-[(1-methylamino)ethylidene]-2H-1,2-benzothiazin - 4(3H) - one - 1,1 - dioxide, M.P. 235–236° C. (dec.).

*Analysis.*—Calcd. for $C_{11}H_{12}N_2O_3S$ (252.30): C, 52.37; H, 4.79; N, 11.10; S, 12.71%. Found: C, 52.54; H, 4.78; N, 11.40; S, 12.99%.

(B) By repeating the procedure of Example III(A), except that an equivalent quantity each of ethylamine, isopropylamine and n-butylamine is used in place of the methylamine used therein, there are obtained as respective products the corresponding 3-[(1-ethylamino)ethylidene], 3-[(1-isopropylamino)ethylidene] and 3-[(1-n-butylamino)ethylidene] derivates of 2H-1,2-benzothiazin-4(3H)-one-1,1-dioxide.

EXAMPLE IV

3-[1-benzylamino)ethylidene] - 2H - 1,2 - benzothiazin-4(3H)-one-1,1-dioxide.—A mixture of 2.39 g. (0.01 mole) of 3 - acetyl-2H-1,2-benzothiazin-4(3H)-one-1,1-dioxide, 3.21 g. (0.03 mole) of benzylamine and 10 ml. of water is stirred until dissolution of the solid is complete. The resultant two-phase liquid mixture is allowed to stand for one day after which time the water is removed in vacuo (steam bath). The residual red oil is dissolved in minimal methanol, and about 20 ml. of water is added. A slight excess of aqueous hydrochloric acid is added dropwise. The resulting red gum is separated by decantation, washed with water (2× 30 ml.) and then triturated with acetone-methanol (1:1) to give the yellow crystalline product, 3-[(1-benzylamino)-ethylidene]-2H-1,2-benzothiazin-4(3H)-one-1,1-dioxide, M.P. 196–199° C.

*Analysis.*—Calcd. for $C_{17}H_{16}N_2O_3S$ (328.40): C, 62.18; H, 4.91; N, 8.53; S, 9.76%. Found: C, 62.42; H, 5.06; N, 8.52; S, 9.68%.

EXAMPLE V

3 - [(1-anilino)ethylidene]-2H-1,2-benzothiazin-4(3H)-one-1,1-dioxide.—A mixture of 12.0 g. (0.05 mole) of 3-acetyl-2H-1,2-benzothiazin - 4(3H)-one-1,1-dioxide and 14.0 g. (0.15 mole) of aniline is heated in a steam bath overnight. Removal of excess aniline in vacuo affords a red oil which when triturated with ethanol (95%) gives the crude crystalline product (two crops). Recrystallization of the combined crops from acetone affords 9.36 g. (59.6%) of 3-[(1-anilino)ethylidene]-2H-,2-benzothiazin-4(3H)-one-1,1-dioxide, M.P. 163–165° C.

*Analysis.*—Calcd. for $C_{16}H_{14}N_2O_3S$ (314.37): C, 61.13; H, 4.49; N, 8.91; S, 10.20%. Found: C, 61.02; H, 4.52; N, 8.83; S, 10.20%.

EXAMPLE VI

Methyl 3-[(1-amino)ethylidene]-2,3-dihydro-4-oxo-4H-1,2-benzothiazin-2-acetate-1,1-dioxide.—2.3 grams (0.1 g. atom) of sodium is dissolved in 75 ml. of absolute methanol and the excess methanol is removed in vacuo. To the residue is added 100 ml. of dimethylformamide (DMF) plus 23.8 g. (0.1 mole) of 3-[(1-amino)ethylidene]-2,3-dihydro-4-oxo-4H-1,2-benzothiazin - 1,1 - dioxide. The solution turns a blood red. With magnetic stirring, 16.83 g. (0.11 mole) of methyl bromoacetate in 30 ml. of DMF is added. The red color is almost immediately discharged. The resulting light brown solution is stirred for 3 hrs. after which most of the DMF is removed in vacuo. Dilution with 500 ml. of water precipitated a semisolid gum which crystallizes upon standing. The solid is collected and taken up in methylene chloride-chloroform which affords separation of any unchanged starting material. Recrystallization from chloroform-methylene chloride yields 17.7 g. (63.4%) of methyl 3 - [(1 - amino)ethylidene]-2,3-dihydro-4-oxo-4H-1,2-benzothiazin-2-acetate-1,1-dioxide, M.P. 183.5–185.5° C.

*Analysis.*—Calcd. for $C_{13}H_{14}N_2O_3S$ (310.33): C, 50.31; H, 4.55; N, 9.03; S, 10.33%. Found: C, 50.47; H, 4.53; N, 9.14; S, 10.47%.

EXAMPLE VII

The alkylation procedure of Example VI is followed except that an equivalent quantity of ethyl 3-bromopropionate, benzyl bromide, β-phenethyl bromide, dimethylaminoethyl chloride, diethylaminopropyl chloride, bromoacetic acid and 4-bromobutyric acid, respectively, is used as the alkylating agent in place of the methyl bromoacetate therein to yield, as respective products, the corresponding 2-ethoxycarbonylethyl( 2-benzyl, 2-phenethyl, 2-dimethylaminoethyl, 2-diethylaminopropyl, 2-carboxymethyl and 2-carboxypropyl derivatives of 3-[(1-amino)ethylidene] - 2,3 - dihydro-4H-1,2-benzothiazin-4-one-1,1-dioxide.

EXAMPLE VIII

3 - [(1 - amino)ethylidene]-2,3-dihydro-4-oxo-4H-1,2-benzothiazin-2-acetamide-1,1-dioxide.—A solution of 3.1 g. (0.01 mole) of methyl 3-[(1-amino)ethylidene]-2,3-dihydro-4-oxo-4H-1,2-benzothiazin - 2 - acetate-1,1-dioxide in 200 ml. of methanol is saturated with ammonia containing 0.1 g. of dissolved sodium and allowed to stand at room temperature in a tightly stoppered flask for two weeks. Subsequent solvent removal in vacuo yields the product, 3[(1-amino)ethylidene]2,3-dihydro-4-oxo-4H-1,2-benzothiazin-2-acetamide-1,1-dioxide.

What is claimed is:

1. A 3-(amino-ethylidene)-2,3-dihydro-4H-1,2-benzothiazin-4-one-1,1-dioxide having the formula:

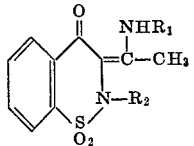

wherein $R_1$ is a member selected from the group consisting of hydrogen, lower alkyl, phenyl and phenyl-lower alkyl and $R_2$ is a member selected from the group consisting of hydrogen, lower alkyl, phenyl-lower alkyl, di-(lower alkyl)-amino-lower alkyl, lower alkoxy-carbonyl-lower alkyl, carboxy-lower alkyl and carbamyl-lower alkyl.

2. The compound of claim 1 which is 3-[(1-amino)ethylidene]-2,3-dihydro-4H-1,2-benzothiazin-4-one - 1,1-dioxide.

3. The compound of claim 1 which is 3-[(1-amino)ethylidene]-2,3-dihydro-2-methyl - 4H - 1,2 - benzothiazin-4-one-1,1-dioxide.

4. The compound of claim 1 which is 3-[(1-methylamino)ethylidine] - 2H - 1,2 - benzothiazin-4(3H)-one-1,1-dioxide.

5. The compound of claim 1 which is 3-[(1-benzylamino)ethylidene] - 2H - 1,2 - benzothiazin-4(3H)-one-1,1-dioxide.

6. The compound of claim 1 which is 3-[(1-anilino)ethylidene]-2H-1,2-benzothiazin-4(3H)-one-1,1-dioxide.

7. The compound of claim 1 which is methyl 3-[(1-amino)ethylidene] - 2,3 - dihydro-4-oxo-4H-1,2-benzothiazin-2-acetate-1,1-dioxide.

8. The compound of claim 1 which is 3-[(1-amino)ethylidene] - 2,3 - dihydro-4-oxo-4H-1,2-benzothiazin-2-acetamide-1,1-dioxide.

References Cited

UNITED STATES PATENTS 3,284,450 11/1966 Kraaijeveld et al. ____ 260—243
3,408,347 10/1968 Shavel et al. _____ 260—243

OTHER REFERENCES

Zinnes et al., J. Org. Chem., vol. 30, 2241 (1965).

HENRY R. JILES, Primary Examiner
JOHN M. FORD, Assistant Examiner

U.S. Cl. X.R.

252—300; 260—999